United States Patent [19]

Davies et al.

[11] Patent Number: 4,596,586
[45] Date of Patent: Jun. 24, 1986

[54] SEPARATOR FOR OIL AND GAS, AND SEPARATION PROCESS

[75] Inventors: Evan E. Davies, Woking; Jiri R. Nebrensky, East Molesey, both of England

[73] Assignee: The British Petroleum Company p.l.c., London, England

[21] Appl. No.: 318,160

[22] Filed: Nov. 4, 1981

Related U.S. Application Data

[63] Continuation of Ser. No. 138,127, Apr. 7, 1980, abandoned.

[30] Foreign Application Priority Data

Apr. 11, 1979 [GB] United Kingdom ............... 7912806
May 30, 1979 [GB] United Kingdom ............... 7918733

[51] Int. Cl.$^4$ ............................................. B01D 19/00
[52] U.S. Cl. .............................. 55/52; 55/177; 55/191; 55/204; 55/459 D
[58] Field of Search .............. 55/52, 171, 177, 184, 55/191, 203, 204, 205, 459 R, 459 A, 459 B, 459 C, 459 D; 209/144, 211; 210/788, 512.1, 304, 305, 512.2, 512.3

[56] References Cited

U.S. PATENT DOCUMENTS

| | | | |
|---|---|---|---|
| 2,010,435 | 8/1935 | Matheson | 210/304 X |
| 2,781,910 | 2/1957 | Fontein | 210/788 |
| 3,163,508 | 12/1964 | Tuck et al. | 55/204 X |
| 3,204,772 | 9/1965 | Ruxton | 55/204 X |
| 3,259,246 | 7/1966 | Stavenger | 55/459 R |
| 3,288,300 | 11/1966 | Bouchillon | 55/459 R X |
| 3,331,193 | 7/1967 | Woodruff | 55/191 |
| 3,481,118 | 12/1969 | Willis et al. | 55/459 R X |
| 3,512,651 | 5/1970 | Laval, Jr. | 210/512.1 X |
| 3,516,551 | 6/1970 | Wallen et al. | 55/459 D X |
| 3,548,569 | 12/1970 | Jepsen et al. | 55/459 R X |
| 3,668,825 | 6/1972 | McIlvaine | 55/459 R X |
| 3,684,093 | 8/1972 | Kono et al. | 210/788 |
| 3,802,570 | 4/1974 | Dehne | 55/459 R X |
| 3,959,139 | 5/1976 | El-Hindi | 210/512.1 X |
| 4,072,481 | 2/1978 | Arscott et al. | 55/177 |

FOREIGN PATENT DOCUMENTS

| | | |
|---|---|---|
| 1544111 | 3/1970 | Fed. Rep. of Germany . |
| 484686 | 3/1970 | Switzerland . |
| 796886 | 6/1958 | United Kingdom . |
| 2000054 | 1/1979 | United Kingdom ......... 55/204 |
| 2035150 | 6/1980 | United Kingdom . |

Primary Examiner—Robert Spitzer
Attorney, Agent, or Firm—Morgan, Finnegan, Pine, Foley & Lee

[57] ABSTRACT

A separator suitable for separating a crude oil feed containing gas into gas and liquid the separator comprising a vessel (4) having an inlet (6) for feed disposed so that feed introduced under a pressure gradient is caused to form a downwardly flowing vortex of liquid from which an upwardly flowing vortex of gas separates, an upper outlet (10) for the vortex of gas comprising a pipe (8) extending downwardly into the vessel from the top thereof, a lower outlet (16) for the liquid, the vessel further having located therein below the inlet (6) a downwardly extending hollow truncated cone (12) or cylinder to provide a surface for the downwardly flowing vortex of liquid, the walls (7) of the vessel (4) being spaced apart from the cone to provide therebetween a disengaging chamber (15) and an outlet (20) for the discharge of gas from the disengaging chamber.

7 Claims, 4 Drawing Figures

SEPARATOR FOR OIL AND GAS, AND SEPARATION PROCESS

This is a continuation of application Ser. No. 138,127 filed Apr. 7, 1980 and now abandoned.

This invention relates to a separator suitable for separating oil containing gas into gas and liquid, to a separator system comprising a plurality of separators connected together in series and also to a process of effecting such a separation.

When oil is produced from a well, it is forced from the reservoir by natural pressure up the well surface. As the oil rises the pressure becomes less and gas associated with the oil is progressively released from solution.

After emerging from the well, it is necessary to treat the mixture of liquid oil and gas to remove the free gas and also dissolved gas which is likely to come out of solution when the oil is maintained at about atmospheric pressure as, for example, during transport in a tanker.

In order to do this, large vessels known as separators have been previously employed. These are generally long, horizontally disposed cylinders containing a system of baffles, defoamers and demisters. Single stage separation employing one vessel and multi-stage separation employing a series of vessels have both been previously employed. In the case of single stage separation some at least of the butanes and pentanes separate with the gas and other heavier components may also separate with the gas and thus be lost from the liquid.

This loss can be largely avoided by multi-stage separation in which a number of vessels are used in series, the oil passing from one vessel to the next and undergoing a successive reduction of pressure in each. In each vessel only a portion of the gas can come out of solution. As many as seven stages of separation have been used to ensure the maximum retention of butane and pentane in the liquid oil.

Such bulky and heavy equipment is suitable for use on land where space and weight are not of primary importance. However, on offshore production platforms there is a considerable financial inducement to reduce the size and weight of processing equipment and, in particular, the deck area occupied.

Cyclones, that is to say, vessels which separate mixtures into the oppositely moving vortices have been previously proposed for separating gas and liquid. For example, UK Patent Specification No. 1227128 discloses a cyclone separator, which comprises a shell of circular cross section disposed vertically and having an inlet adjacent to the upper end thereof which introduces the feed mixture tangentially to the shell where it is caused to flow along a downward helical path within the shell. The mixture separates into an inner vortex of gas and a outer vortex of liquid. The shell has an outlet for the removal of the gas from the shell and a system for removing liquid from the vortex of gas and adding it to the separated liquid. The separator is suitable for use as a gas scrubber, that is, for a feed in which the continuous phase is a gas and contains minor quantities of liquid.

However, crude oil emerging from a well usually consists of a foaming mixture, the continuous phase being liquid and there is a need for a separator capable of separating such a mixture, but which is smaller than the conventional separators referred to above.

Further, U.S. Pat. No. 3,548,569 discloses a cyclone separator for separating gas-liquid mixtures, in particular, chemically reactive gases susceptible to dimerisation from associated liquids. A weir system is included as a means of level control.

For operations in an oilfield, for example, at a crude oil gathering centre, it has been found by experience that the flowrate of the feed to the separator may vary within wide limits, for example, by a factor of 5:1. Also the composition of the feed tends to vary in that slugs of liquid oil or slugs of gas are received by the separator. To be effective in oilfield operations a separator must be capable of handling both the variations in flowrate of the feed and changes in its proportions of gas and liquid. The above mentioned U.S. Pat. No. 3,548,569 would not be suitable for such operations because it requires both the flowrate and its composition to be reasonably constant.

Our UK Patent Application No. 2000054A describes a cyclone separator capable of separating a foaming crude oil mixture and a separator system employing same, and our Co-pending UK Patent Application No. 43043/78 describes an improved cyclone separator. The cyclone separator has now been further developed and improved.

According to the present invention a cyclone separator suitable for installation at a crude oil gathering centre for separating a crude oil feed containing gas into gas and liquid comprises a vessel having (i) a controllable inlet for feed disposed so that feed introduced under a pressure gradient is caused to form a downwardly flowing vortex of liquid and an upwardly flowing vortex of gas, (ii) an upper outlet for the vortex of gas comprising a pipe extending downwardly into the vessel from the top thereof herein referred to as a vortex finder, (iii) a lower outlet for the liquid, the vessel further having located therein below the inlet, (iv) a downwardly extending hollow cylinder to provide a surface for the downwardly flowing vortex of liquid, the walls of the vessel being spaced apart from the cylinder to define therebetween a chamber, herein referred to as a disengaging chamber and (v) an outlet for the discharge of gas from the disengaging chamber.

The separator is desirably sized so that it can operate with feeds of varying composition, for example, slugs of liquid followed by slugs of gas typically encountered at a crude oil gathering centre.

Desirably there is located in the region of the lower end of the cylindrical surface a baffle to contact the downwardly flowing vortex of liquid.

A convenient arrangement is for the baffle to be in the form of a plate and disposed transversely with respect to the cylinder and in the region of the lower end thereof, e.g. below, to provide a gap between the plate and the lower end of the cylinder so that in use the liquid contacts the plate and flows over its edges into the lower portion of the vessel. Conveniently the size of the gap is adjustable and the plate is disposed symmetrically with respect to the longitudinal axis of the cylinder.

By controllable inlet is meant one that can be controlled to vary the inlet velocity independently of the feed rate. Valve means or the like upstream of the controllable inlet can be provided to control the rate at which feed is admitted to the vessel.

The inlet to the vessel is preferably rectangular or square in cross section to assist tangential entry.

The controllable inlet can comprise an adjustable shutter to restrict the inlet, for example, as described in our UK Patent Application No. 2000054A and our Co-pending UK Patent Application No. 43043/78 (Serial No. 2035150A).

Provision may be made for injecting a foaming agent, e.g. silicone oil, at any convenient point.

By the term cylinder in the present specification we mean to include not only a cylinder but also a truncated cone whose angle at the apex is less than 5° (when viewed in a vertical section). In the case of a truncated cone the diameter of the cone at its lower end is conveniently at least 0.90 that of the upper end.

In addition there can be an assembly of baffles located below the plate, the assembly comprising a plurality of flat baffles disposed radially with respect to the axis of the vessel and vertically.

The ratio of the diameter of the vortex finder to that of the vessel in the region of the inlet can be from 0.40 to 0.80, conveniently from 0.55 to 0.65. The vortex finder can extend into the vessel below the centre line of the inlet and can conveniently terminate at a level intermediate the centre line of the inlet and the upper end of the disengaging chamber or can extend to the level of the upper end of the disengaging chamber.

The vortex finder can have in the region of the lower end thereof, a flared portion herein referred to as a skirt, to reduce the amount of liquid entrained in the gas flowing upwardly in the vortex finder.

References in the present specification to lower, upper and vertical refer to the separator in its disposition for normal use.

Conveniently the lower outlet for the enhanced liquid is in the form of a pipe disposed so as to withdraw liquid from a point near the base of the vessel.

The disengaging chamber may be provided by an enlarged lower portion of the vessel.

In the case of a vessel whose horizontal section is circular the diameter of the enlarged portion may be conveniently 1.10 to 2.00 that of the upper portion.

The outlet for the discharge of gas from the disengaging chamber has the purpose of preventing gas not separated from the liquid in the centrifugal action in the cylinder from causing excessive foaming in the disengaging chamber.

In the present specification the volume within the vessel below where cylindrical surface terminates is considered to be part of the disengaging chamber.

According to one embodiment of the invention a separator system suitable for separating a feed comprising crude oil containing gas and having a gas:liquid ratio of 1.5:1 to 15:1 by volume at separation conditions into a liquid containing no more than 10% gas and a gas containing not more than 500 ppm by volume of liquid comprises a separator as hereinbefore described, the vortex finder of which is connected either to (a) a gas scrubber for removing the oil from the gas, or (b) the inlet of a second separator as hereinbefore described.

The volume of the first separator vessel in relation to the volume of the second separator vessel can be in the range 1.5:1 to 6:1.

When the system comprises two separators the vortex finder of one may be connected to the inlet of the other by means of a pipe including an elbow, and desirably a plurality of straightening vanes are included in the line to reduce spinning motion of the gas.

The purpose of the gas scrubber or second separator is to remove the droplets of liquid oil from the gas. The gas scrubber can be a, vessel containing surface provided, for example, by steel wool, fine wire, rock wool, glass fibre or the like on which surface the droplets of oil collect. The surface can be arranged so that the droplets fall to, and collect, at the base of the vessel. A particularly convenient surface is provided by a woven steel wool sold under the trade name of Knitmesh.

The feed may also contain solids which are normally present in crude oil in the amounts in which they are normally present. Such solids are separated with the liquid oil.

The feed may have a gas:liquid ratio of from 1:5.1 to 15:1 and may optionally contain water in amount up to 50% (both amounts being by volume referred to the liquid at separation conditions) and the pressure inside the vessel can be from 1 to 70 bar absolute and the process can involve controlling and operating conditions within the ranges specified to obtain a separated gas containing not more than 100 ppm vol of liquid oil and a separated liquid oil containing not more than 10% gas.

The process can be controlled to yield gas containing less than 50 ppm of liquid oil and less than 10 ppm.

In many cases it is preferred to control the inlet velocity to the vessel in the range 5 to 100 m/sec to improve vortex formation.

The invention is illustrated by reference to the accompanying drawing in which

Figure 1:
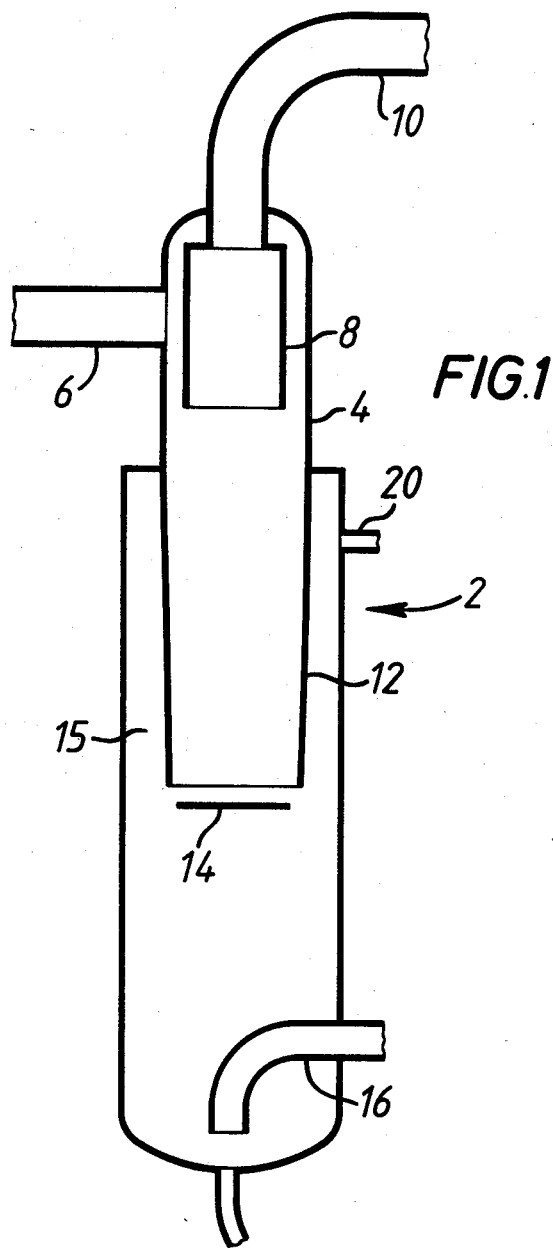
FIGS. 1 and 2 are vertical sections of different embodiments of a separator according to the invention.
Figure 2:
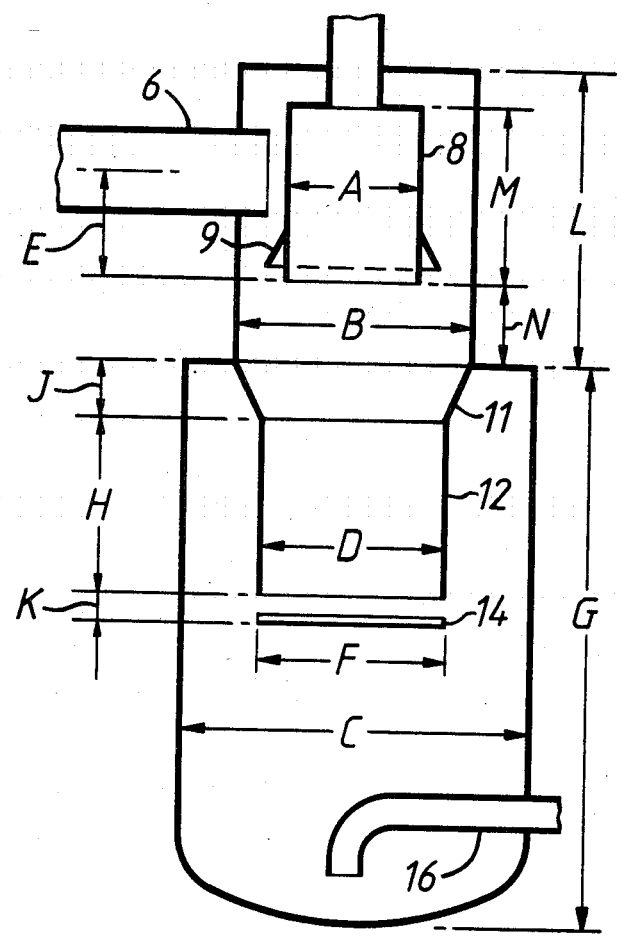

In all the embodiments shown in FIGS. 1 to 4 the separator is indicated generally by reference numeral 2 and comprises a vessel 4 havng an inlet 6 of rectangular cross section disposed tangentially with respect to the vessel 4 to cause incoming feed to form a downwardly spinning vortex of liquid and an upwardly spinning vortex of gas. The inlet 6 is controllably variable as described in our co-pending UK Patent Applications Nos. 2,000,054A and 43043/78 to provide a turndown capacity. The separator has a vortex finder 8 leading to an outlet pipe 10. In the embodiments shown in FIGS. 1, 3 and 4 the separator has a hollow truncated cone 12 of small angle (the angle at the apex of the cone is 3°) to provide a surface for the vortex of liquid. The ratio of the diameter of the cone at its lower end to that at its upper end is 0.88. In FIG. 2 a hollow cylinder 12 is provided supported by a truncated cone 11. In all the Figures a disengaging chamber 15 is provided by the space between cone 12 and the walls 7 of the lower part of the vessel and an outlet 20 shown for withdrawing gas from the disengaging chamber is provided.

Figure 3:
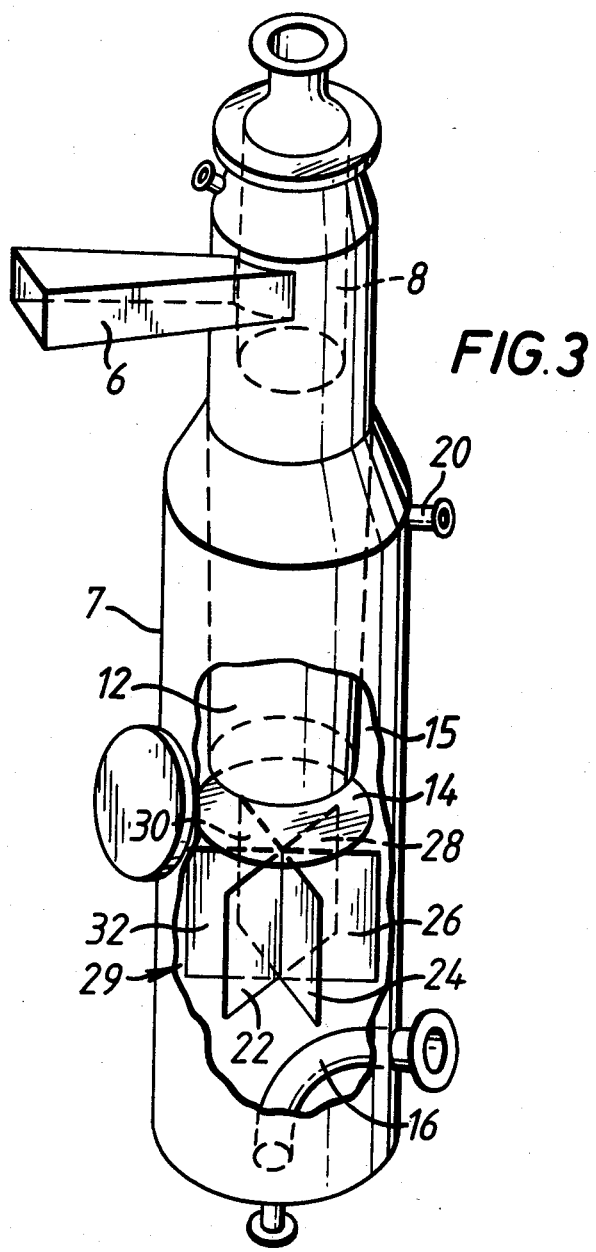
FIGS. 3 and 4 are side elevations of further embodiments of the invention. Although not shown in the drawings all embodiments included the adjustable shutter to restrict the inlet as described in our UK Patent Applications Nos. 2,000,054A and 43043/76 and also a valve upstream of the shutter to control the rate of entry of feed to the vessel.
Figure 4:
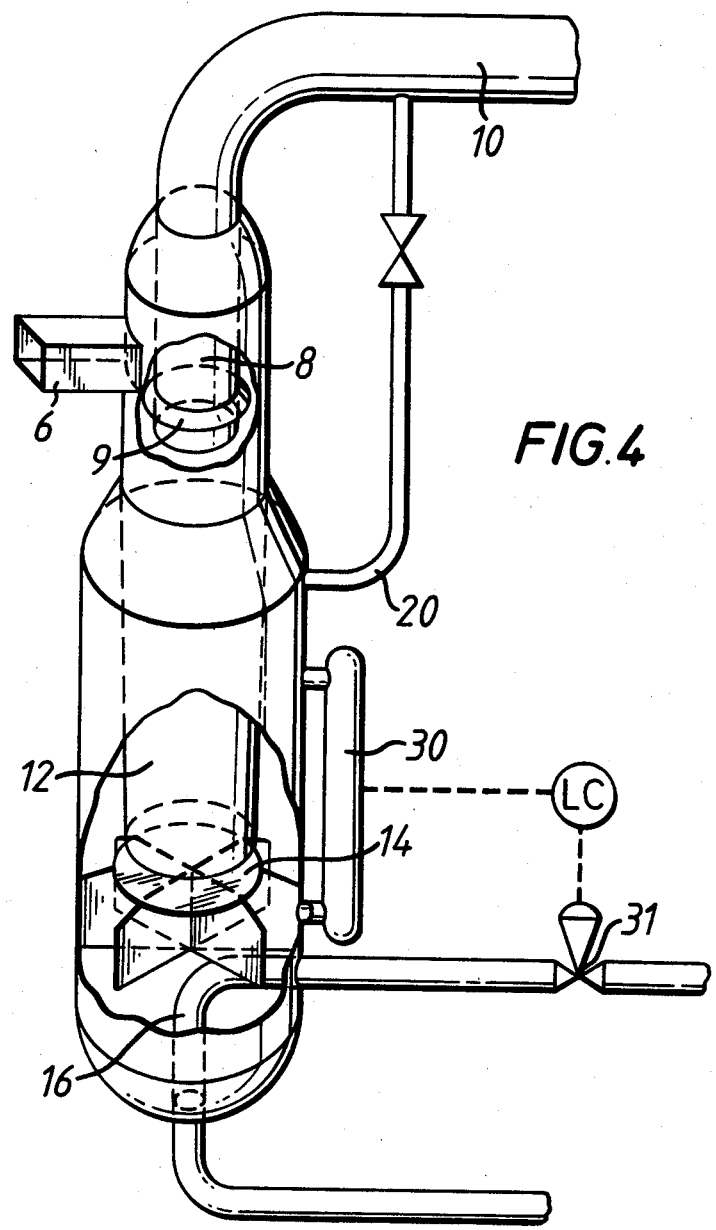

Located transversely with respect to the axis of the cone 12 and a small distance below the lower end thereof is a baffle in the form of a circular plate 14, the purpose of which is to arrest the vortex of liquid. The diameter of the plate is desirably at least 0.75 that of the base of the cone or cylinder and can be up to 1.50. Means are provided (not shown) for moving the plate up to down to adjust the size of the gap between the lower end of the cone and the plate to optimize the performance. In FIG. 3 there is located below the plate 14 a baffle assembly indicated generally by numeral 29 consisting of six rectangular plates 22, 24, 26, 28, and 32 disposed vertically and radially with respect to the axis of the vessel. At the base of the vessel is a curved outlet 16 for the liquid, arranged so that liquid is withdrawn from near the bottom of the vessel to reduce the risk of entrainment of gas in the liquid during discharge.

A set of straightening vanes (not shown) may be included in the outlet pipe 10 to eliminate any spinning of the gas.

Referring to FIG. 2 the separator has a short conical portion 11 from which is supported a cylinder 12. The vortex finder 8 has a flared portion to provide a skirt 9 to reduce the tendency of droplets of liquid on the exterior to be entrained in the gas flowing upwardly into the vortex finder.

All the embodiments include a liquid level control system 30 (shown only in FIG. 4) in which a valve 31 on outlet pipe 16 is controlled by a level controller responsive to the liquid level in the vessel.

EXAMPLES 1 AND 2

Use of a single cyclone: feed containing anti-foam agent

The cyclone separator was a single vessel as illustrated in FIG. 2 and the dimensions were as follows:

| | |
|---|---|
| Cyclone diameter (upper cylinder) (B) | 1017 mm |
| Height of upper cylinder (L) | 1767 mm |
| Diameter of the cylinder 12 (D) | 895 mm |
| Height of the cylinder 12 (H) | 1740 mm |
| Height of cone connecting the cylinders (J) | 453 mm |
| Diameter of the disengaging chamber (C) | 1177 mm |
| Height of the disengaging chamber (G) | 3909 mm |
| Overall height (L & G) | 5676 mm |
| Diameter of the vortex finder (A) | 591 mm |
| Length of the vortex finder below inlet centre line (E) | 620 mm |
| Total length of vortex finder (M) | 1030 mm |
| Distance from lower end of vortex finder to top of disengaging chamber (N) | 467 mm |
| Diameter of the vortex arrestor plate (F) | 914 mm |
| Location of the vortex arrestor plate below the lower cylinder end (K) | 102 mm |

(Diameters referred to are interior diameters)

References to diameters to internal diameters where appropriate.

The operating conditions and performance data for both examples are summarized in the following Table:

| | | Example 1 | Example 2 |
|---|---|---|---|
| Feed | | | |
| Total rate* | cubic meter/hour | 1124 | 1872 |
| Liquid oil flow | m³ oil/hr (bbl/day) | 397.5 (60,000) | 474.3 (71,600) |
| Temperature | °C. | 37.8 | 37.8 |
| Inlet pressure | bar abs. | 30.0 | 21.7 |
| Equil. gas content | vol % | 64.7 | 74.7 |
| Gas/liquid ratio* | vol/vol | 1.83 | 2.95 |
| Silicone anti-foam | make | Dow Corning | Rhodosil |
| | grade | 12,500 cSt | 60,000 cSt |
| | dose liter/hour | 0.20 | 0.95 |
| | vol/10⁶ vol liquid oil | 0.5 | 2 |
| Operation | | | |
| Inlet area | cm² | 243 | 280 |
| Liquid oil level above the lower end of the lower cylinder | mm | 1215 | 607 |
| inlet velocity | meter/sec | 12.9 | 18.6 |
| Products | | | |
| Liquid from lower outlet | | | |
| Total rate | cubic meters/hour | 418.4 | 494.1 |
| | | Example 1 | Example 2 |
| Gas content | vol % | 5 | 4 |
| Gas from vortex finder | | | |
| Total rate at inlet pressure | cubic meters/hour | 706.1 | 1377.9 |
| oil content | ppm | 2 | 2 |

*assumes equilibrium state.

The separators described above can operate with feeds which may contain slugs of gas followed by slugs of liquid of up to 20 pipe diameters. They can also operate at rates of throughput which vary by a factor of 10.

The separators are also suitable for installation at a crude oil gathering centre.

Unless the context clearly requires otherwise references to volumes of gas and gas to liquid ratios are referred to standard conditions of temperature and pressure, i.e. 14.7 psig (1.013 bar absolute) and 60° F. equivalent to 15.6° C.

We claim:

1. A separator suitable for installation at a crude oil gathering center for separating a crude feed containing gas into gas and liquid, the separator comprising a vessel having (i) a controllable inlet disposed so that feed introduced under a pressure gradient is caused to form a downwardly flowing vortex of liquid and an upwardly flowing vortex of gas, (ii) an upper outlet for the vortex of gas comprising a pipe extending downwardly into the vessel from the top thereof, (iii) a lower outlet for the liquid positioned to withdraw liquid from near the base of the vessel, the vessel further having located therein below the inlet, (iv) a downwardly extending cylindrical tube which is a true cylinder when viewed in vertical section to provide a surface for the downwardly flowing vortex of liquid, the walls of the vessel being spaced apart from the cylindrical tube to define therebetween a disengaging chamber, (v) an outlet for the discharge of gas from the disengaging chamber and (vi) a baffle disposed transversely with respect to the cylindrical tube to engage the downwardly flowing vortex of liquid, said baffle being located below the lower end of the cylindrical tube and sized so as to provide a gap between its edges and the walls of the vessel so that the liquid on contacting the baffle is caused to flow radially outwardly and pass into the vessel below the baffle.

2. A separator as claimed in claim 1 having a baffle assembly comprising a plurality of plates disposed radially with respect to the axis of the vessel and vertically.

3. A separator as claimed in claim 1 wherein the lower outlet comprises a pipe passing through the wall of the vessel, the lower end of the pipe being positioned near the base of said vessel to provide a liquid seal at the base of said vessel.

4. A separator as claimed in claim 1 wherein the vessel has an enlarged lower portion and the walls of said enlarged lower portion are spaced apart from the cylindrical tube to define the disengaging chamber therebetween.

5. A separator as claimed in claim 1 wherein the ratio of the diameter of the vortex finder to the diameter of the vessel in the region of the inlet is from about 0.40 to 0.80.

6. A process for separating a feed comprising crude oil containing gas into a liquid containing not more than 10% by volume of gas and a gas containing not more than 200 ppm by volume of liquid oil, which process comprises passing the feed into a separator as claimed in claim 1 disposed sustantially vertically and forming a downwardly flowing vortex of liquid and an upwardly flowing vortex of gas and controlling the operating conditions to form liquid containing not more than 10% by volume of gas and gas containing not more than 100 ppm by volume of liquid.

7. A process as claimed in claim 6 wherein the feed has a gas:liquid ratio of from 1.5:1 to 15:1 and may optionally contain water in amounts up to 50% both amounts being by volume referred to the liquid at separation conditions, and the pressure in the vessel is from 1 to 70 bar absolute and controlling the operating conditions to yield a gas containing not more than 50 ppm of liquid oil.

* * * * *